April 25, 1950          E. W. TODD          2,505,580
DIRECT COUPLED TRACTOR PLOW Filed Feb. 19, 1945          3 Sheets-Sheet 1

INVENTOR.
EVERETT W. TODD
BY
A.S.Krotz
ATTORNEY

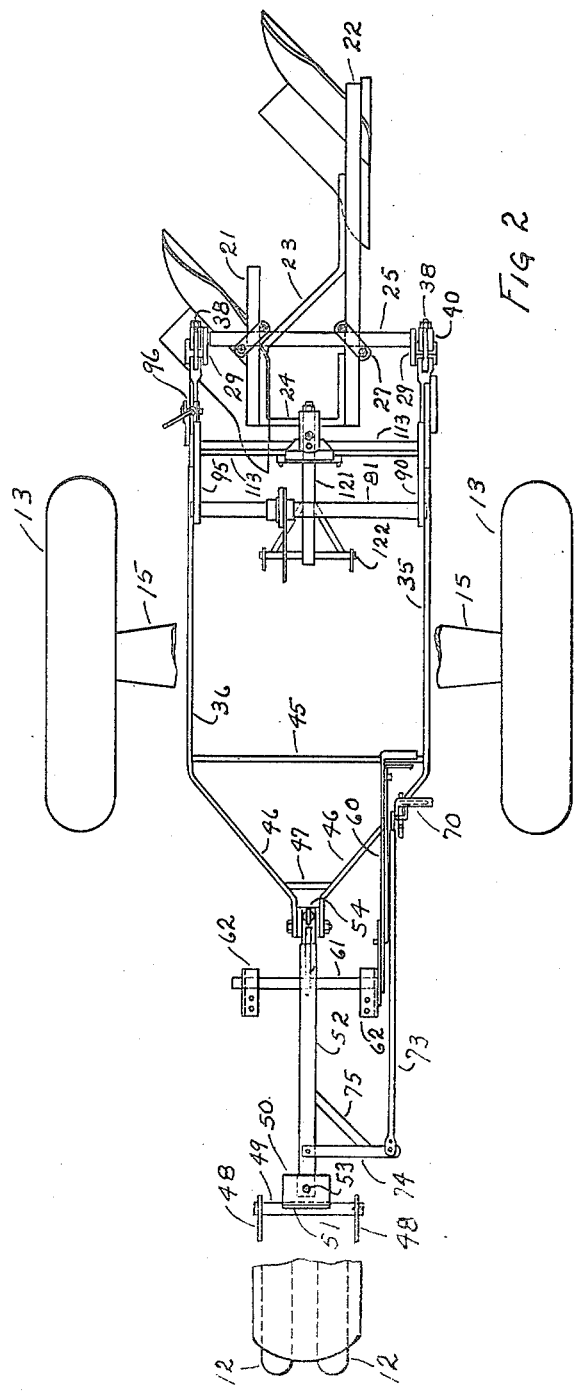

April 25, 1950          E. W. TODD          2,505,580
DIRECT COUPLED TRACTOR PLOW
Filed Feb. 19, 1945          3 Sheets-Sheet 3
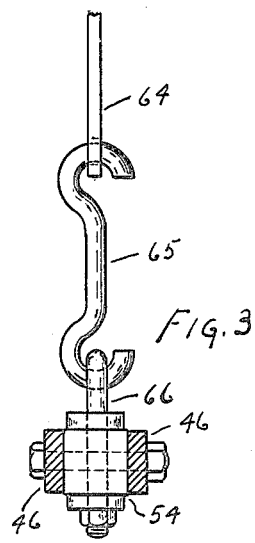
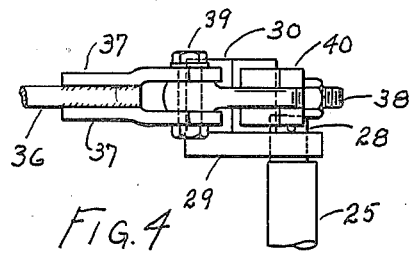
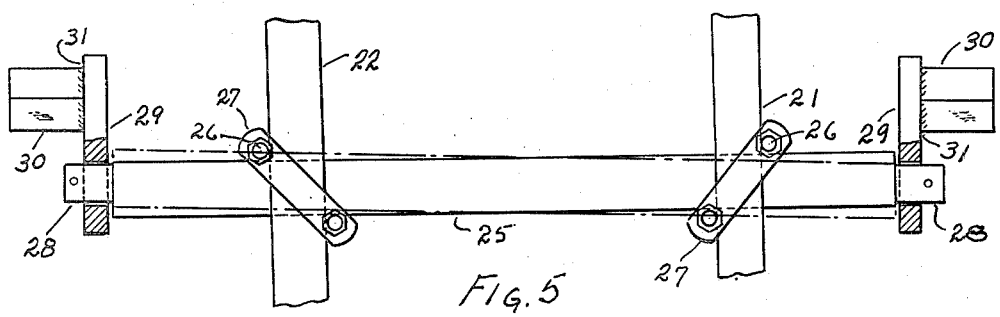
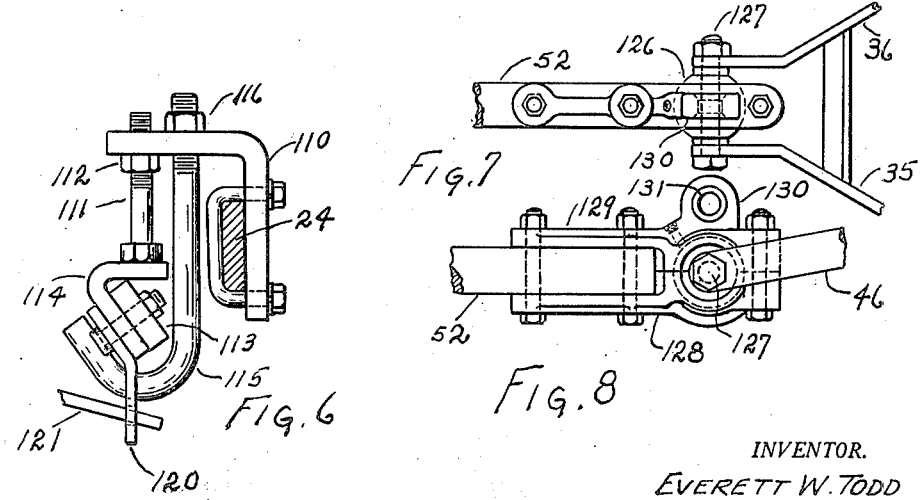
INVENTOR.
EVERETT W. TODD
BY
*A. S. Knob*
ATTORNEY Patented Apr. 25, 1950

2,505,580

UNITED STATES PATENT OFFICE 2,505,580

DIRECT-COUPLED TRACTOR PLOW

Everett W. Todd, Racine, Wis., assignor to The Massey-Harris Company, Racine, Wis., a company of Maryland Application February 19, 1945, Serial No. 578,676

2 Claims. (Cl. 97—50)

The present invention relates to direct coupled plows for a tractor having preferably a power lift and other means either mounted on the plow, or tractor whereby the tractor operator may, in addition to driving the tractor, control the plow by means of conveniently spaced levers, etc.

An object of the present invention is to provide a plow which can be conveniently attached and detached from the tractor and wherein the operator is generally not required to do anything after the plow is once adjusted, except to attend to the depth plowed.

Many attempts have been made to design a direct coupled plow which would do as satisfactory work as the well known horse drawn sulky or gang plow. These attempts have largely failed because of the influence of the movements of the tractor on the plow. Applicant's invention was conceived for the purpose of remedying this fault in direct coupled plows.

One of the objects of the present invention is to make the various connections to the tractor so the plow will be permitted to travel along in a manner which will produce the best results with a minimum expenditure of power.

To these and other useful ends my invention consists of parts, combinations of parts, or their equivalents and mode of operation as hereinafter described and claimed and shown in the accompanying drawings in which:

Fig. 2 is a top view of my invention as shown in Figure 1, but showing a mere fraction of the tractor so as to more clearly illustrate the invention.

Figs. 3, 4, 5 and 6 are enlarged detail drawings illustrating certain essential parts of my invention.

Figs. 7 and 8 are enlarged drawings of a modification of the universal joint between the draw bar and plow frame.

Fig. 9 is an enlarged drawing illustrating the adjustable link connection from the power lift arm to one side of the plow.

Figure 1:
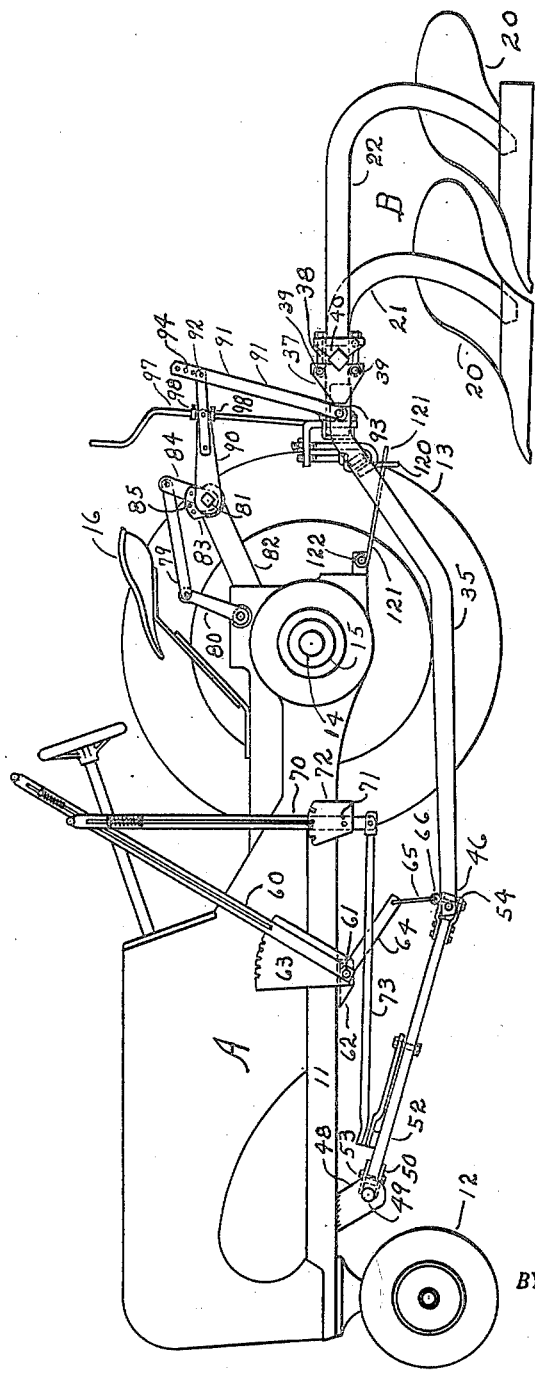
Fig. 1 is a side elevational view of a conventional tractor equipped with my invention, the near rear wheel being removed to more clearly illustrate the invention and the plow being shown in a working position.

As thus illustrated the tractor in its entirety is designated by reference character A; the plow mechanism which includes the plow bottoms, beams, plow frame, and draw bar is designated in its entirety by reference character B; numeral 11 designates the frame of the tractor, having front guiding wheels 12—12 and rear driving wheels 13—13 which are secured to the ends of axles 14—14 (one not shown), the axles extending through axle housings 15—15. The tractor is provided with a seat 16. All of the plow operating levers are, as will hereinafter appear, positioned within easy reach of the operator.

My improved plow attachment may consist of two plow bottoms 20—20. It may also be designed for a single plow bottom or three plow bottoms.

As illustrated the plow bottoms have front and rear beams 21 and 22 secured together at their rear by means of a brace 23 and at their front by means of a brace 24. In Figure 2 I have shown these braces as being integrally formed. I secure a shaft 25 to beams 21 and 22, preferably by means of U-bolts 26 and straps 27 (see Figures 2 and 5), so the shaft may be easily loosened and turned for a purpose which will hereinafter appear.

On the ends of shaft 25 I provide eccentrically and oppositely positioned pintles 28—28. These pintles extend freely through openings in plates 29—29, the plates having short square members 30—30 which extend outwardly and are preferably welded to the plates as at 31. I provide forward plow frame members 35 and 36 which are shaped about as shown in the figures, their rear ends having welded thereto and on opposite sides thereof, plates 37—37 (see Figure 4) between which eyebolts 38 are secured in vertically spaced relation, by means of bolts 39—39. I provide caps 40—40 through which bolts 38 extend. Members 37 and 40 are provided with depressions on their adjacent sides which are adapted to embrace the major part of members 30. Thus when bolts 38 are made taut, members 29 will be held rigidly to members 35 and 36. Clearly therefore when shaft 25 is turned, its transverse angle relative to members 35 and 36 will be changed because of pintles 28, the purpose being to change the alignment of the rear frame relative to the front frame so as to make the plow frame trail straight with its connection to drawbar 52. For changing the depth of furrow, all that is necessary is to change lever 60. Members 35 and 36 are secured together near their front ends by means of a brace 45. These front ends converge and are secured together preferably by another brace 47.

Near the forward end of the tractor frame 11 I secure spaced depending arms 48—48 having hingedly mounted thereon at their lower ends a shaft 49. I provide rearwardly extending plates 50—50 which are welded to shaft 49 as at 51—51, the front end of a draw bar 52 being pivotally mounted between members 50 by means of a bolt 53. Thus drawbar 52 is at its rear end free to move horizontally and vertically and this bar is secured to the front ends of members 46 by means of a universal joint which in its entirety is designated by numeral 54. The object of this universal joint is to permit the plows to swing sidewise or vertically relative to the rear end of member 52.

I provide means for adjustably positioning universal joint 54 vertically and transversely as follows: A lever 60 is secured to one end of a shaft 61, the ends of this shaft being rotatably mounted in brackets 62—62, one secured to each side of frame 11. A sector 63 is rigidly secured to one of the brackets 62, an arm 64 is secured to shaft 61 and a link 65 is hingedly secured to the rear end of this arm, the lower end of the link being hingedly secured to an eyebolt 66 carried by member 54 (see Figure 3). Thus member 54 may be raised and lowered by means of lever 60 and link 65 will permit member 54 to be swung sidewise.

A lever 70 is pivotally mounted on the tractor frame as at 71 and having a notched sector 72. A link 73 is hingedly mounted on the lower end of lever 70, its front end being hingedly secured to the outer end of an arm 74, the inner end of this arm being secured to drawbar 52 and being further anchored to the drawbar by means of a brace 75.

It will be seen that by moving lever 70 back and forth, member 54 will be swung sidewise in either direction. Thus levers 60 and 70 determine the vertical and transverse position of member 54, to thereby control the depth and width of the furrows turned. The plow frame and plows must be tilted transversely from time to time relative to the tractor for obvious reasons and the means for this operation will hereinafter appear.

The means for raising, lowering and tilting the plow are as follows: A hydraulic lift is preferably mounted within the rear upper corner of the tractor frame having an arm 80. A shaft 81 is pivotally mounted on brackets 82—82 which are secured to the tractor frame, shaft 81 having secured thereto a hub with a plate 83. Another hub is rotatably mounted on shaft 81 having an arm 84 which lies freely against plate 83 and having a link connection 79 to arm 80 as shown in Figure 1. Plate 83 near its upper end is provided with a series of closely spaced holes which are positioned on a radius with shaft 81. A stop pin or bolt 85 is adapted to be positioned in one of these holes, whereby when arm 84 is moved forward far enough, shaft 81 will be turned but arm 84 is free to move rearwardly away from bolt 85, which is the position desired when the plows are operating, so the depth is controlled by the position of member 54 and not by the power lift. Under some conditions it may be desirable to have member 83 secured rigidly to member 84. A hole is therefore provided in member 84 which registers with the holes in member 83.

A rearwardly extending arm 90 is secured to one end of shaft 81 having a link 91 which is hinged to arm 90 as at 92, the lower end of link 91 being hingedly connected to frame member 35 as at 93. Link 91 is provided with a series of closely spaced holes 94 for making the proper adjustments so that when the plow is operating, arm 84 will be a short distance away from bolt 85. On the other end of shaft 81 I secure an arm 95 having hingedly mounted on its free end a block 96, through which a crank shaft 97 extends having collars 98—98 secured to the shaft, so as to prevent end movement of the shaft but provide means for adjustment within reach of the operator for leveling the plow. A block 99 having a pintle 100 which extends freely through member 36 is provided. The lower end of shaft 97 is screw threaded into block 99, the thread on shaft 97 being long enough to provide normal adjustments between the rear end of arm 95 and member 36.

It will be evident from the foregoing that the plow is permitted to swing sidewise on universal joint 54.

In Figure 6 I illustrate the preferred means for adjusting the down suck of the plow bottoms. On cross member 24 I mount an inverted L-shaped member 110 (see Figure 6) having a cap screw 111 screw-threaded into the forward end of this member and having a nut 112 for locking the cap screw into its adjusted position. A transverse brace 113 is secured to members 35 and 36 having secured thereto a bracket 114 on the top of which the head of cap screw 111 rests when the plow is operating. By moving this cap screw up or down in bracket 110 the down suck of the plow bottoms is adjusted. Generally it is desired to permit member 24 to rise slightly after the power lift begins to raise the plow frame. I provide a hook bolt 115 which extends under member 113 and through an opening in member 110 the upper being screw threaded for an adjusting nut 116. Thus member 115 may be raised far enough to hold member 114 against the head of member 111 or it may be lowered so as to permit the beams of the plow bottoms and the plow frame to rise slightly on pintles 26 as an axis before the plow bottoms begin to rise. A certain amount of free movement thus provided is beneficial to the operation of the plow.

I provide means to limit the side swing of the plow as follows: A U-shaped loop 120 is secured to member 114 as illustrated in Figure 6 into which a bar 121 slidably rests, the bar being transversely pivoted to the tractor at its front end as at 122. Thus the plow frame is free to rise and lower but will be permitted to be moved sidewise only a limited distance for obvious reasons.

In Figures 7 and 8 I illustrate a preferred form of universal joint wherein the forward ends of members 35 and 36 are secured to a ball shaped member 126 by means of a bolt 127.

I provide upper and lower members 128 and 129 which at their rear ends rotatably embrace member 126, their forward ends being secured to the rear end of member 52 as shown. Member 129 has a projection 130 with an opening 131 into which link 65 is hooked.

By referring to Figures 1 and 2, it will be seen that member 90 is considerably longer than member 95, the object of this arrangement being to raise and lower the left hand side of the plow frame faster than the right, thus to maintain a level furrow at different depths and to maintain a nearly level plow frame when the plow is in a raised position after the tractor wheel leaves the furrow.

Clearly as in the matter of the connection of the plow frame to the drawbar, many minor detailed changes may be made without departing from the spirit and scope of my invention as recited in the appended claims the drawings merely disclosing the preferred design of the various elements and their connections.

Having thus shown and described my invention I claim:

1. In combination with a tractor having a power lift, a drawbar secured to the forward end of the tractor by means of a universal joint, a frame having attached thereto earth working means, said frame extending forwardly under the frame of the tractor and being connected to the rear end of said draw bar by means of a universal joint, means associated with said power lift for lifting the rear end of said frame on said last universal joint as an axis, a lever positioned within reach of the tractor operator adapted to move the rear end of said drawbar transversely on said first universal joint as an axis, another lever positioned within reach of the operator adapted to raise and lower the rear end of said drawbar on said first universal joint as an axis, said frame lifting means in its connection to the frame having manually operated means for tilting the frame transversely relative to the tractor.

2. A device as recited in claim 1 including, the means associated with said power lift and frame including transversely spaced generally rearwardly extending arms, each arm having a link connected to the adjacent side of the frame, the land side arm being longer than the other arm to thereby move the land side of the frame more rapidly than the other side of the frame when raising the frame.

EVERETT W. TODD.

REFERENCES CITED

The following references are of record in the file of this patent:

UNITED STATES PATENTS

| Number | Name | Date |
|---|---|---|
| 1,240,758 | Morton | Sept. 18, 1917 |
| 1,378,842 | Dittbrenner | May 24, 1921 |
| 1,501,652 | Ferguson | July 15, 1924 |
| 1,916,945 | Ferguson | July 4, 1933 |
| 2,089,137 | Slife et al. | Aug. 3, 1937 |
| 2,123,555 | Morkovski | July 12, 1938 |
| 2,140,144 | Silver | Dec. 13, 1938 |
| 2,159,669 | Morkoski | May 23, 1939 |
| 2,174,310 | Tuft et al. | Sept. 26, 1939 |
| 2,222,115 | Mott | Nov. 19, 1940 |
| 2,223,002 | Ferguson | Nov. 26, 1940 |
| 2,265,970 | Miller | Dec. 9, 1941 |
| 2,302,502 | Morkoski et al. | Nov. 17, 1942 |
| 2,319,670 | Ego | May 18, 1943 |
| 2,339,225 | Strandlund | Jan. 11, 1944 |
| 2,403,360 | Graham | July 2, 1946 |
| 2,407,064 | Dewey | Sept. 3, 1946 |
| 2,416,207 | Olson | Feb. 18, 1947 |
| 2,420,530 | Evans | May 13, 1947 |

OTHER REFERENCES

"Plow Book," page 2, published by the Ferguson-Sherman Manufacturing Corporation of Dearborn, Michigan, in 1941.